United States Patent [19]

Yasumatsu

[11] 4,130,253
[45] Dec. 19, 1978

[54] SEAT BELT WINDING DEVICE
[75] Inventor: Jun Yasumatsu, Toyota, Japan
[73] Assignee: Toyota Jidosha Kogyo Kabushiki Kaisha, Aichi, Japan
[21] Appl. No.: 818,409
[22] Filed: Jul. 25, 1977
[30] Foreign Application Priority Data Oct. 14, 1976 [JP] Japan .......................... 51-137917[U]

[51] Int. Cl.² ..................... A62B 35/02; B65H 75/48
[52] U.S. Cl. ......................... 242/107.1; 242/107.4 R; 280/747
[58] Field of Search ............... 242/107–107.7; 297/388, 389; 280/744–747

[56] References Cited
U.S. PATENT DOCUMENTS

| 749,971 | 1/1904 | Nordhoff | 242/107.3 |
| 3,549,203 | 12/1970 | Rawson | 297/389 X |
| 4,065,156 | 12/1977 | Tanaka et al. | 297/388 X |

Primary Examiner—Harvey C. Hornsby
Assistant Examiner—John M. Jillions
Attorney, Agent, or Firm—Koda and Androlia

[57] ABSTRACT

A seat belt winding device of the type for winding up two seat belts on a single shaft one over the other including a base, a shaft rotatably supported by the base and for winding up the two seat belts, a housing covering the base, shaft and wound up belts and an arm integral with and extending from the housing and pressing against the wound up seat belts thereby insuring that the two belts are completely wound up and that the same length of belt is wound out for both belts at the same time.

15 Claims, 7 Drawing Figures

SEAT BELT WINDING DEVICE

BACKGROUND OF THE INVENTION

1. Field of Invention

This invention relates to seat belt winding devices and more particularly to seat belt winding devices in which two seat belts are wound up on a single shaft one over the other.

2. Prior Art

In conventional seat belt winding devices for protecting passengers during a collision of a motor vehicle, the three-point type seat belt which consists of a lap belt and a shoulder belt have been widely used. In these three-point type seat belt systems, when the passenger is not using the belt or only a part thereof is being used, the unused portions are wound up by means of spring-loaded winding devices, thereby improving the fitness characteristics and housing of the seat belts.

In the prior art three-point seat belt systems, it has been accepted that two separate winding devices must be installed, one for the lap seat belt and one for the shoulder seat belt to insure the best fitness characteristics and to house the belts. However, it has been proposed that a single winding device could wind both seat belts up without impairing the fitness characteristics and housing.

Referring to FIGS. 1 and 2, shown therein is a seat belt device for winding up two seat belts on a single shaft one over the other. In FIGS. 1 and 2, the seat belt winding device includes a lap seat belt 10A and a shoulder seat belt 10B. Lap seat belt 10A and shoulder seat belt 10B are formed in a single belt and extend through hole 12 in tongue plate 11. This device is designed for winding up both the lap seat belt 10A and the shoulder seat belt 10B on a single shaft one over the other which extends through a slit in an anchor 14 which is fixed to the upper side wall of a motor vehicle 12 above the seat belt winding device 15. The winding device 15 is fixed to the lower part of the sidewall of the vehicle 13 and is arranged and configured such that a lap seat belt 10A and shoulder seat belt 10B are both wound upon a single springloaded shaft 16 one over the other. Accordingly, by using a two belts winding type seat belt device 15, when either one of the seat belts is extended out of the winding device 15, the other seat belt is also extended out of the device 15 at the same time. Moreover, the lap seat belt 10A and the shoulder seat belt 10B are always kept at an appropriate length since the two belts can be moved one way or the other. Therefore, this two belts winding device 15 has many desirable characteristics even though it is a simplified device.

Even though this two belts winding type seat belt 15 has many desirable characteristics, it has one weak point. The weak point is the tension applied to the seat belt during extension and retraction. If the tension applied is very weak, the two seat belts are not wound very tightly onto the shaft 16 and therefore the two belts are not wound up on the shaft of equal length. This slackened seat belt may entangle in the winding device or prevent the function of the locking bar 19 during an emergency. In an extreme case, it is possible that as a result of the slack the seat belt will not work properly and the fit of the seat belt will be impaired when it is fastened.

Therefore, it is an object of the present invention to overcome the deficiencies of the prior art.

SUMMARY OF THE INVENTION

Accordingly, it is a general object of the present invention to provide a two belts winding type seat belt device which prevents slack from occurring in the seat belt during its operation.

It is another object of the present invention to provide a double winding type seat belt device which insures that the two belts are tightly wound around the winding device shaft.

It is yet another object of the present invention to provide a two belt winding type seat belt device which insures that the same length of belt for each of the two belts is wound up on the shaft of the winding device.

In keeping with the principles of the present invention, the objects are accomplished by a unique seat belt winding device of the type for winding up two seat belts including a base, a shaft rotatably supported by the base and for winding up the seat belts, a means for causing the shaft to wind up the seat belts when the seat belts are extended, a housing covering the base, shaft and wound up seat belts and an arm integral with and extending from the housing pressing against the wound up seat belts thereby insuring that the two seat belts are tightly wound up and that the same length of seat belt is wound out for both belts at the same time when the two seat belts are extended.

BRIEF DESCRIPTION OF THE DRAWINGS

The above-mentioned and other features and objects of the present invention will become more apparent by reference to the following description taken in conjunction with the accompanying drawings, wherein like reference numerals denote like elements and in which.

DETAILED DESCRIPTION OF THE INVENTION

Figures 1, 2:
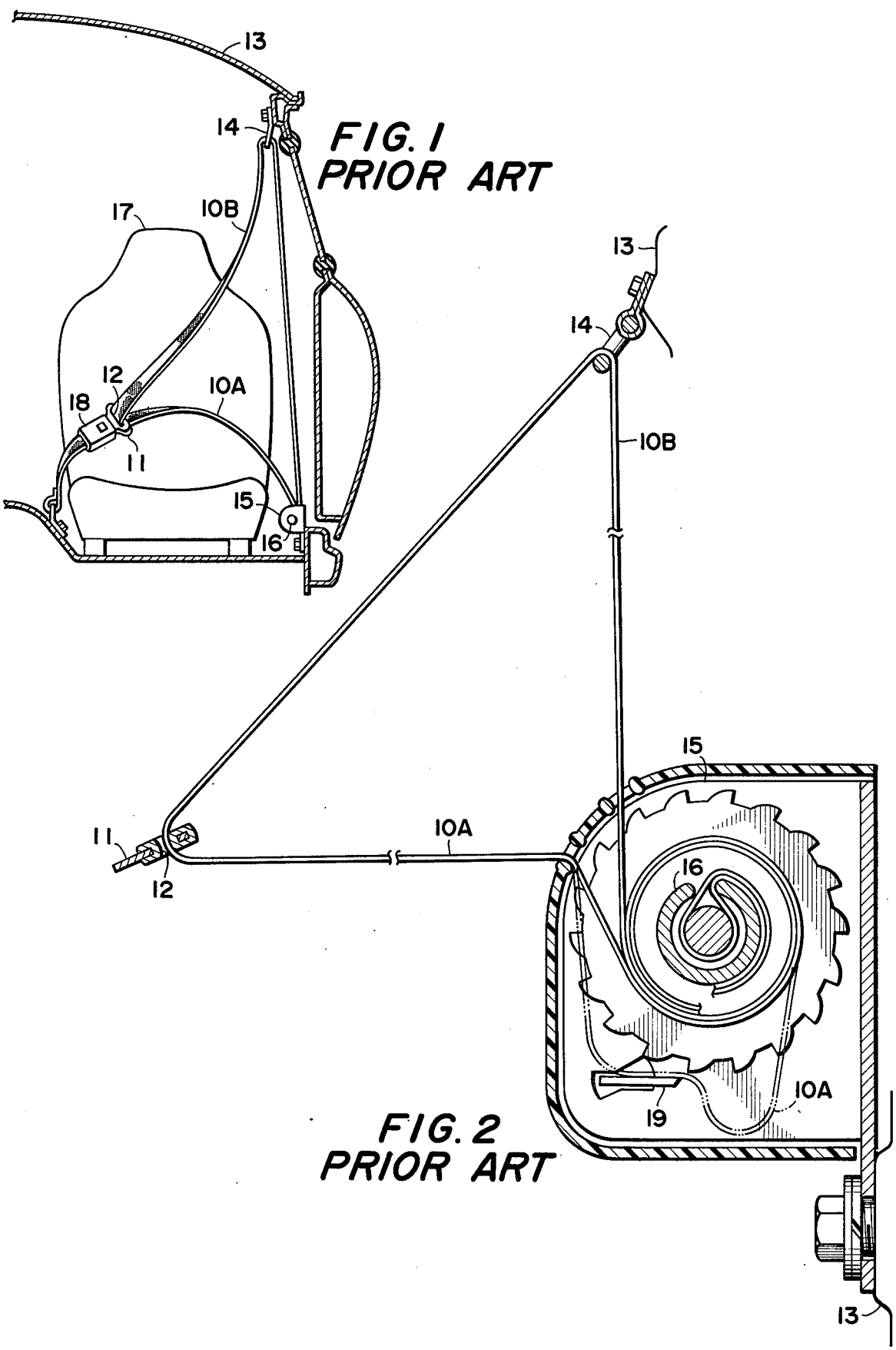
FIG. 1 is a view of a conventional seat belt winding device of the prior art.
FIG. 2 is a cross-sectional view of a seat belt winding device of the prior art.
Figure 3:
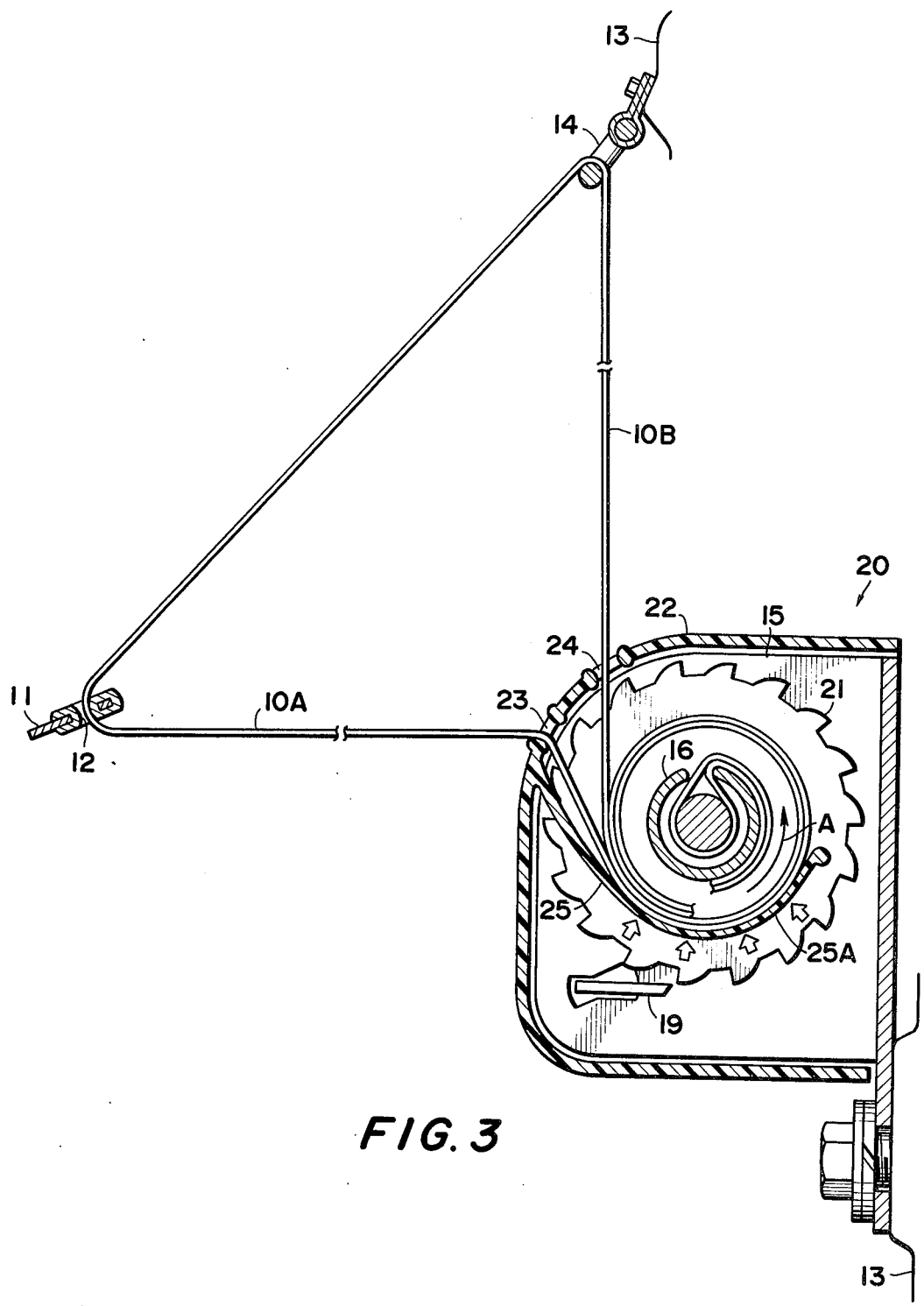
FIG. 3 is a cross-sectional view of a seat belt winding device in accordance with the teachings of the present invention.

Referring more specifically to the drawings, shown in FIG. 3 is a first embodiment of a seat belt winding device in accordance with the teachings of the present invention. In FIG. 3 a seat belt winding device 20 includes a lap seat belt 10A and a shoulder seat belt 10B coupled at one end to a shaft 16 which is rotatably supported by a base 15. Also a locking bar 19 which is a driven by an emergency locking retractor mechanism (not shown) is provided and stops the unwinding of both seat belts during an emergency by engagement with a ratchet plate 21 fixed to shaft 16. A housing 22 enclosing base 15 is provided. Housing 22 not only acts as a dust cover for shaft 16 but also as a result of openings 23 and 24 in housing 22 acts as a guide for lap seat belt 10A and shoulder seat belt 10B. Directly under opening 23 in housing 22 is provided an arm 25. Arm 25 is formed integraly with housing 22 and the end 25A of arm 25 extends along a winding up direction (see arrow A in FIG. 3) of the shaft 16 and presses against the outer surface of the wound up seat belts 10A and 10B wound on shaft 16. Arm 25 provides an appropriate pressure to both seat belts 10A and 10B along the axis of shaft 16.

In practice the housing 22 together with the arm 25 may be formed from a suitable flexible resin.

In operation, when the seat belt either is wound out or wound up the arm 25 exerts a pressure on the two belts so that even if no tension is applied to either seat belt, the seat belts will be tightly wound up and when the seat belts 10A and 10B are wound out, the same length for each seat belt will be wound out. Accordingly, it is impossible for any slack to occur in the seat belt winding device 20 which might impair its operation or efficiency.

Figure 4:
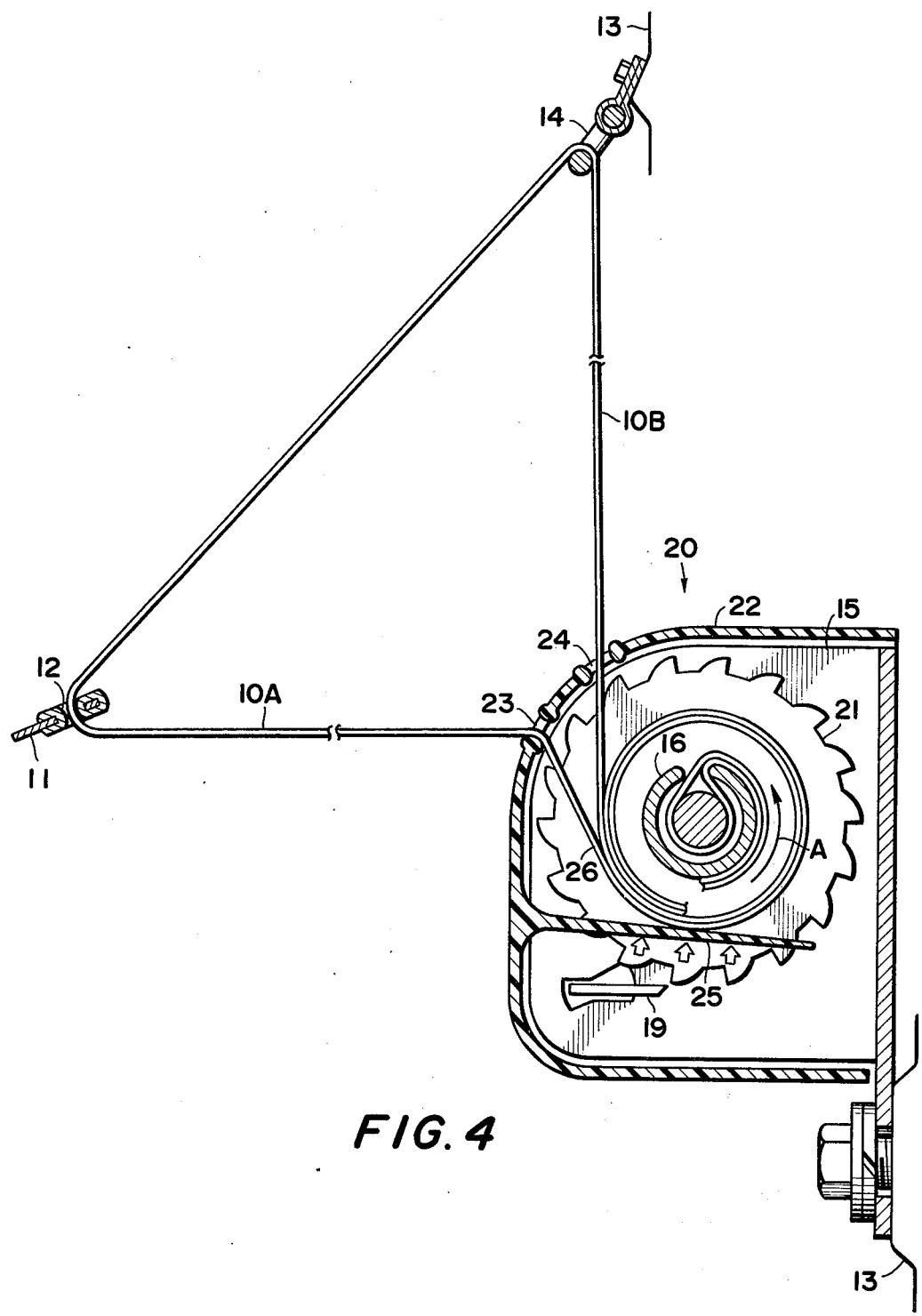
FIG. 4 is a cross-sectional view of a second embodiment of a seat belt winding device in accordance with the teachings of the present invention.

Referring to FIG. 4, shown therein is a second embodiment of a seat belt winding device in accordance with the teachings of the present invention. Since the seat belt winding device of FIG. 4 is similar to the seat belt winding device of FIG. 3, like elements are given like reference numberals and a description of their operation and assembly is omitted.

In FIG. 4 the only difference from the embodiment of FIG. 3 is that the arm 25 is a straight beam and is not curved as in the embodiment of FIG. 3.

In operation, the arm 25 in the embodiment of FIG. 4 operates substantially the same as the arm 25 in FIG. 3 by applying pressure to both seat belts 10A and 10B. However, since the contact area between the arm 25 and the outer surface of the seat belts 10A and 10B is smaller than that in FIG. 3, the winding up power required to be applied to shaft 16 is decreased. In addition, for this embodiment it is desirable that the contact point between the arm 25 and the outer surface of the seat belts be located at the winding out part 26 of the seat belts 10A and 10B or in the vicinity of where both seat belts 10A and 10B are wound off of the shaft 16.

Figure 5:
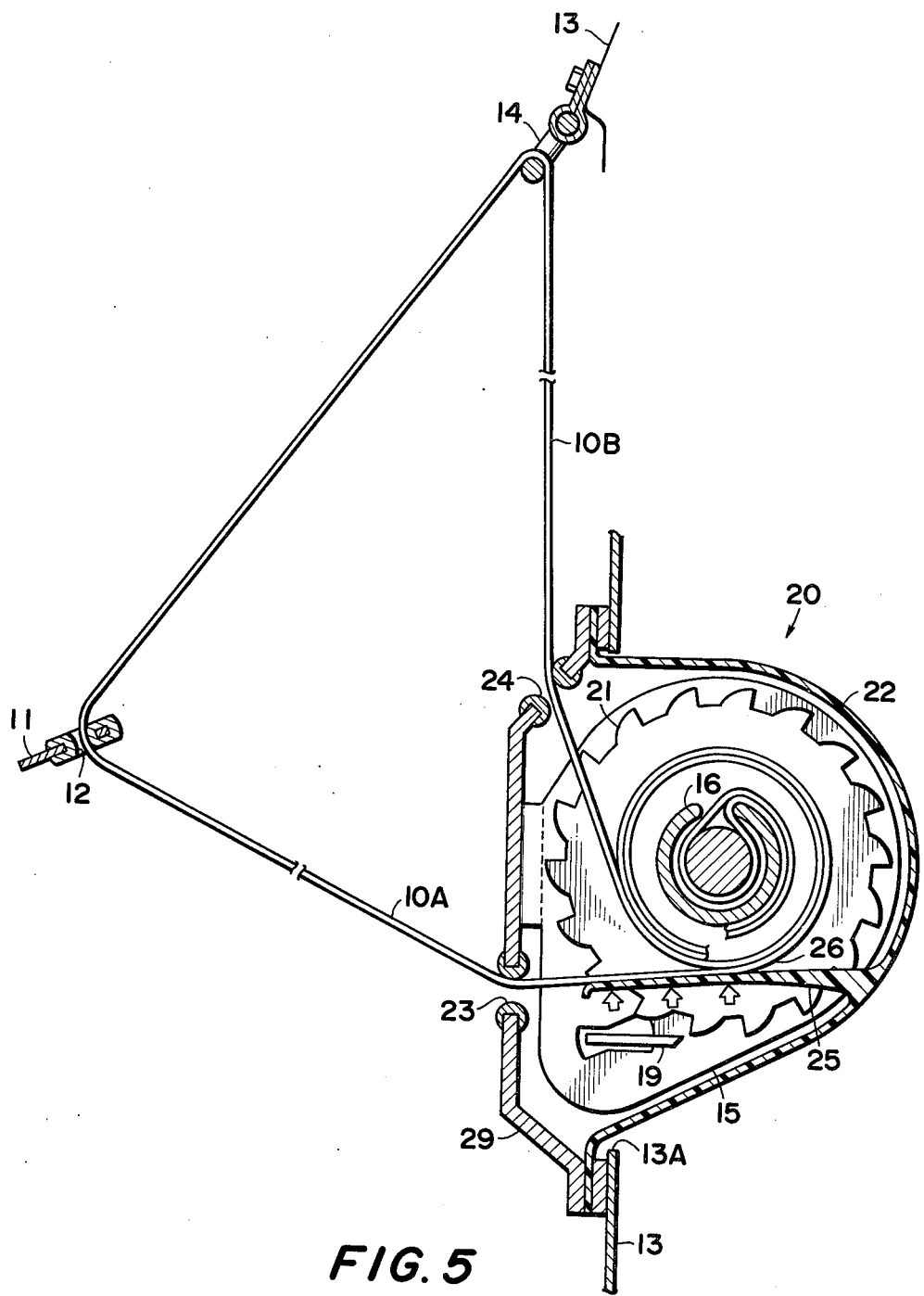
FIG. 5 is a cross-sectional view of a third embodiment of a seat belt winding device in accordance with the teachings of the present invention.
Figure 6:
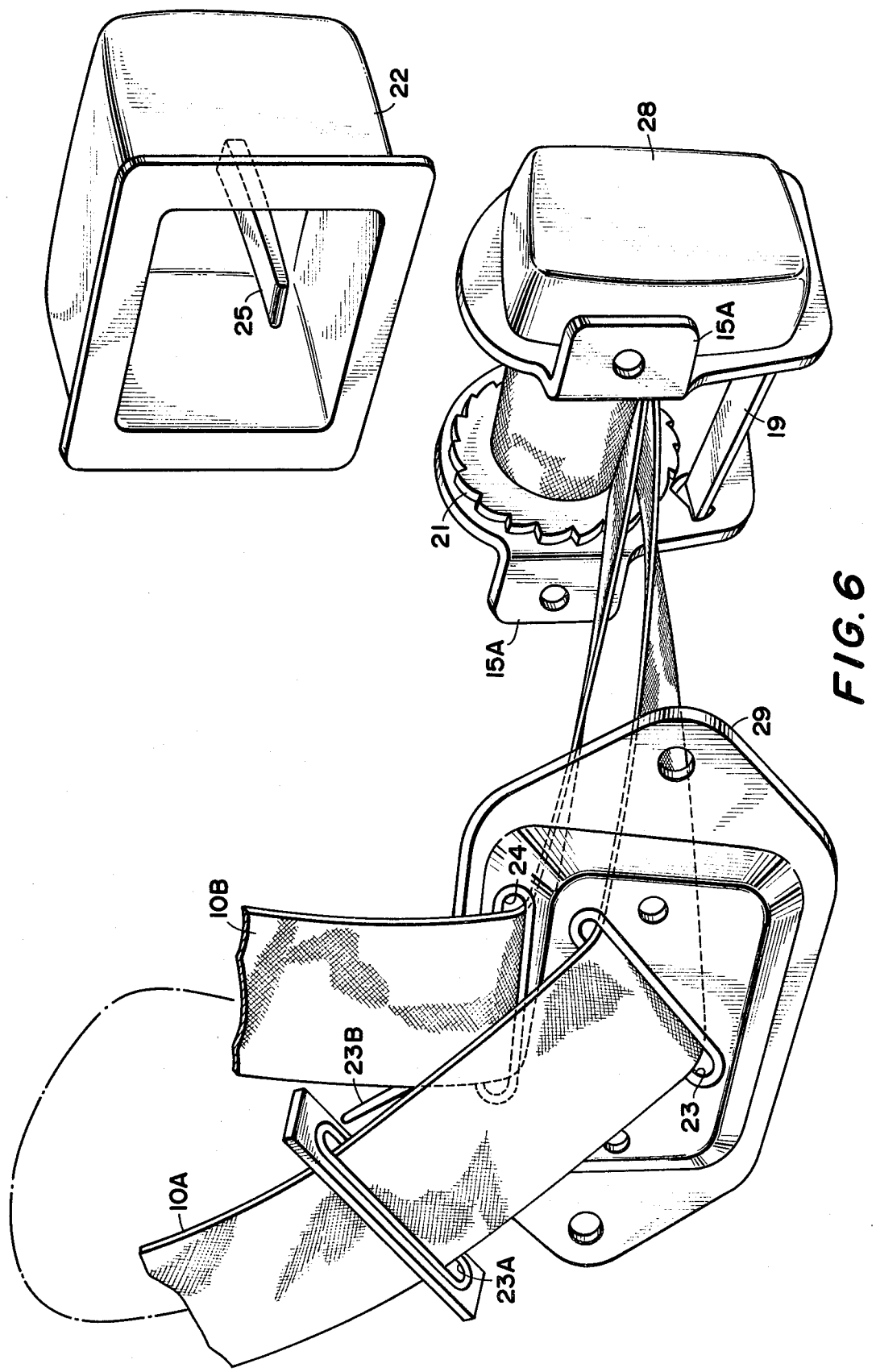
FIG. 6 is a perspective view of the embodiment of FIG. 5.

Referring to FIGS. 5 and 6, shown therein is a third embodiment of a seat belt winding device in accordance with the teachings of the present invention. Since the third embodiment of FIGS. 5 and 6 is similar to the embodiment of FIGS. 3 and 4, like elements are given like reference numerals and a description of their interconnection and operation is omitted. This third embodiment is particularly applicable to situations where the seat belt winding device 20 must be mounted within the body of the vehicle.

After shaft 16, ratchet plate 21, locking bar 19, emergency locking retractor mechanism 28 which operates locking bar 19 and housing 22 are installed on base 15, base 15 is set into an inner part of a motor vehicle through an opening 13A in motor vehicle 13 and is fixed to the motor vehicle 13 by flanges 15A on base 15. Contemporaneous with this installation, a guide plate 29 is fixed to the motor vehicle 13 for the purpose of filling the opening 13A. Openings 23 and 24 are provided in guide plate 29 and are for guiding seat belts 10A and 10B.

In this embodiment the arm 25 which is similar to the arm 25 in FIG. 4 extends from the cover 22 in the direction of the winding out of the seat belts 10A and 10B. Furthermore, a guide 23B having an opening 23A therein is provided on guide plate 29 to control the direction of the winding out of the lap seat belt 10A.

The operation of the embodiment of FIGS. 5 and 6 is substantially the same as the operation of the second embodiment of FIG. 4.

Figure 7:
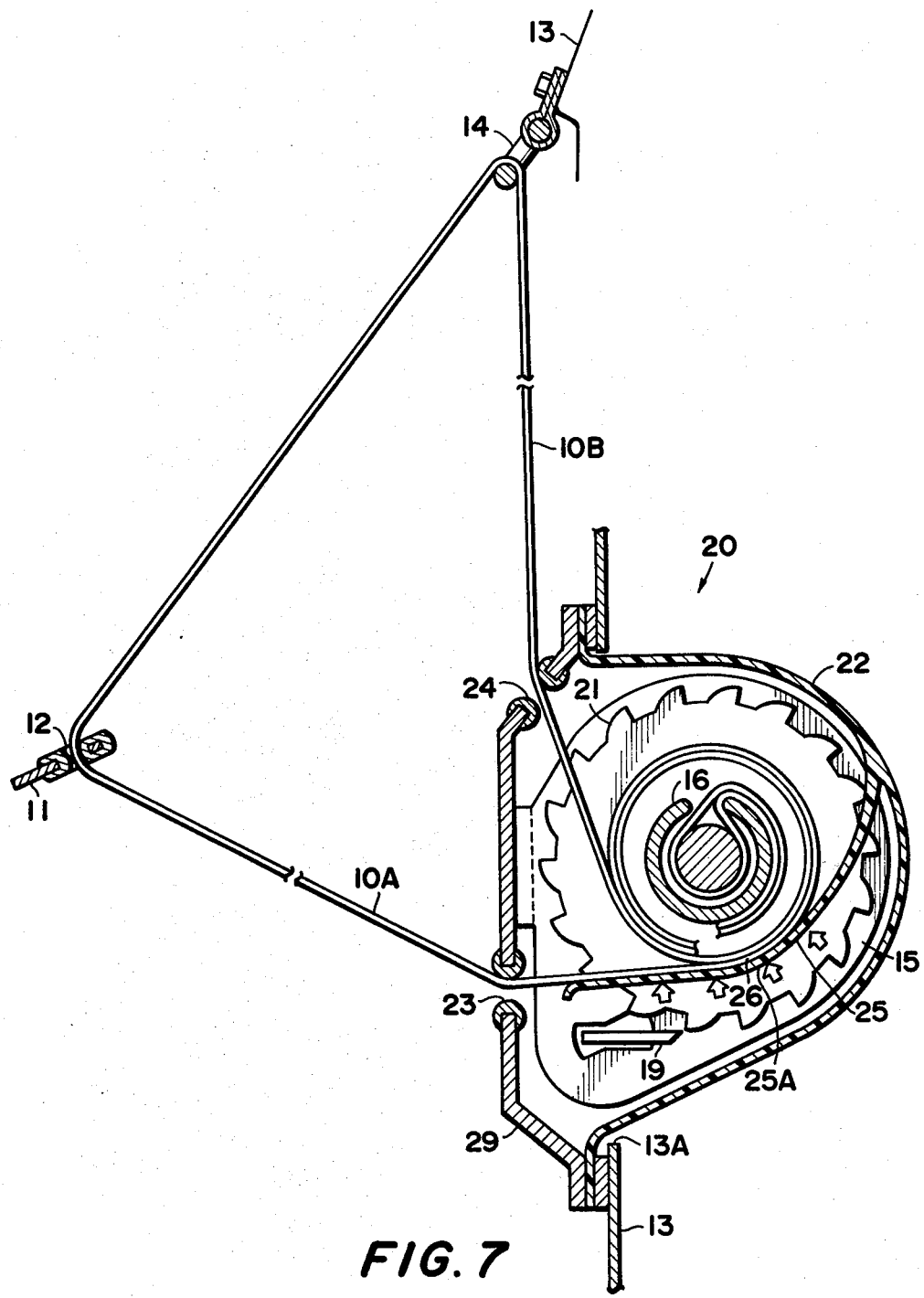
FIG. 7 is a cross-sectional view of a fourth embodiment of a seat belt winding device in accordance with the teachings of the present invention.

Referring to FIG. 7, shown therein is a fourth embodiment of a seat belt winding device in accordance with the teachings of the present invention. Since the embodiment of FIG. 7 is similar to the embodiment of FIGS. 5 and 6, like elements are given like numerals and a description of their interconnection and operation is omitted.

In FIG. 7 the arm 25 is curved and extends from the housing 22 toward the opening 23. In particular the curvature of the arm 25 follows the curve of the seat belt 10A. In operation, the embodiment of FIG. 7 operates in substantially the same manner as the other three embodiments to prevent the seat belt from loosening.

Moreover, in the third and fourth embodiment the arm 25 not only acts to prevent a slackened condition of a seat belt from occurring but also acts as a guide for the lap seat belt 10A to the opening 23 in guide plate 29 since it extends from the winding out part 26 of the wound up seat belts toward the opening 23.

In all cases it is understood that the above-described embodiment is merely illustrative of but a few of the many possible specific embodiments which represent the application of the principles of the present invention. Numerous and varied other arrangements can be readily devised in accordance with these principles by those skilled in the art without departing from the spirit and scope of the invention.

I claim:

1. A seat belt winding device for use in a three point seat belt system comprising:
    two seat belts for use as a lap belt and as a shoulder belt;
    a base;
    a shaft rotatably supported by said base for winding up said seat belts;
    a housing covering said base, shaft and wound up portion of said seat belts; and
    a means for preventing slack of the belts within the housing comprising an arm integral with and extending from said housing pressing against the wound up portion of said seat belts with sufficient force such that said two seat belts are tightly wound up during retraction and such that the same length of seat belt is wound out for both of said two seat belts at the same time when the two seat belts are extended whereby malfunction of said seat belt winding device is prevented.

2. A seat belt winding device according to claim 1 wherein said arm is curved.

3. A seat belt winding device according to claim 2 wherein said arm extends in the winding up direction.

4. A seat belt winding device according to claim 2 wherein said arm extends in a winding out direction.

5. A seat belt winding device according to claim 1 wherein said arm is straight.

6. A seat belt winding device according to claim 5 wherein said arm extends in a winding up direction.

7. A seat belt winding device according to claim 5 wherein said arm extends in a winding out direction.

8. A seat belt winding device according to claim 1 wherein said arm begins beneath an opening in said housing for guiding one of said belts out of said housing.

9. A seat belt winding device according to claim 8 wherein said housing has an upper and a lower opening for guiding said belts out of said housing.

10. A seat belt winding device according to claim 1 wherein said arm is curved and extends under said shaft towards said opening and engages with the outer surface of one of said seat belts, whereby said arm exerts a pressure on said two belts and guides one of said seat belts to said opening.

11. A seat belt winding device according to claim 1 further comprising:
a guide plate having two openings for extending said belts out of said housing.

12. A seat belt winding device according to claim 11 wherein said arm begins on said housing and extends under said shaft and engages with the outer surface of one of said seat belts whereby said arm exerts a pressure on said two belts.

13. A seat belt winding device according to claim 11 wherein one of said openings is lower than the other and said arm further extends to the lower opening whereby said arm guides one of said seat belts to said lower opening.

14. A seat belt winding device according to claim 11 wherein the width of said arm is narrower than the width of said seat belt.

15. A seat belt winding device according to claim 1 wherein said two belts are formed as a continuous belt.

* * * * *